Aug. 27, 1929.  R. MEYER  1,726,037
REVERSING GEAR
Filed Jan. 11, 1928
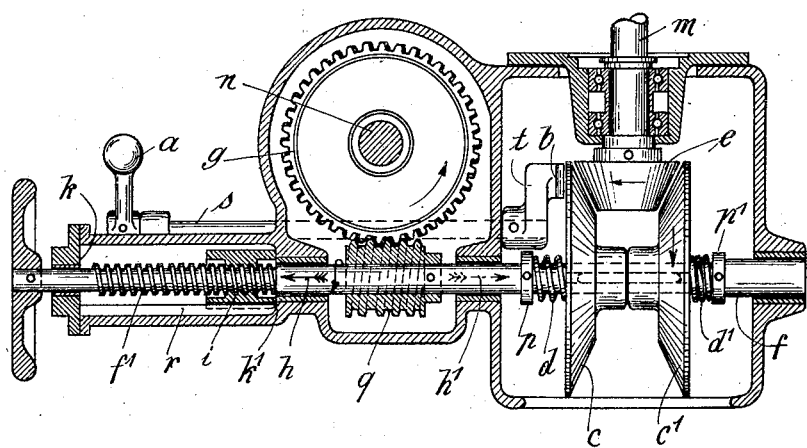
Inventor:
Rudolf Meyer
by
Attorney.

Patented Aug. 27, 1929.

1,726,037

UNITED STATES PATENT OFFICE.

RUDOLF MEYER, OF BAMBERG, GERMANY.

REVERSING GEAR.

Application filed January 11, 1928, Serial No. 245,897, and in Germany July 8, 1927.

This invention relates to a reversing gear with automatic reversing, which is free from certain inconveniences connected with the reversing gears of known types. The gears working with clutches or friction wheels are defective in so far as the pressure to be exerted by the clutch elements has to be produced by springs, weights, levers or the like, wherefrom results an unfavorable efficiency, frequent readjusting being necessary. The travel in both directions of movement is never accurately the same. Reversing gears working with eccentrics or links possess the inconvenience, that the speed is not uniform. Owing to the utilization of cams and the like, the last mentioned reversing gears are comparatively expensive. The reversing gears of all these types can further not be stopped accurately at predetermined position of the machine tool.

These inconveniences are obviated by the invention by utilizing for the pressing pressure of the coupling elements the thrust of a worm, a screw or a worm wheel, the reversing being effected by a nut travelling on a spindle and stopped at certain points so that the spindle is then shifted and reverses the driven shaft.

An embodiment of the invention is illustrated, by way of example, in the only figure of the accompanying drawing in longitudinal section.

The driven shaft $n$ of the machine tool is driven from the driving shaft $m$ through the intermediary of a control shaft $f$. As coupling elements conical friction wheels are used for example, but any other coupling or clutch-elements might be used. On the driving shaft $m$ a bevel pinion $e$ is keyed and on the control shaft $f$ two friction bevel wheels $c$ and $c'$ are shiftably mounted. Behind each friction wheel $c$, $c'$ an abutment $p$, $p'$ respectively is fixed on the control shaft $f$, spiral springs $d$, $d'$ respectively being enclosed between the corresponding abutment and friction wheel.

A worm $q$ is further mounted on the control shaft $f$, a worm wheel $g$ on the driven shaft $n$ meshing with said worm. The portion of the control shaft $f$ which is located in a casing formed between two end walls $k'$, $k$ is constructed as a screw spindle $f'$ on which a nut $i$ is screwed which is guided in a longitudinal groove $r$ of the casing and secured against rotation. On the casing a lever $a$ is mounted so that it can be turned transversely to the control shaft $f$. This lever $a$ is connected by a rod $s$ with a lever arm $t$ the end $b$ of which is bent at right angles and has an inclined end surface adapted to act upon the friction wheel $c$. A similar lever arm might be arranged behind the friction wheel $c'$.

In the drawing the reversing gear is shown in the normal, inoperative position. To set the reversing gear in operation, the lever $a$ is turned so that the inclined end face $b$ of the lever arm $t$ is removed from the friction wheel $c$. The friction wheel $c'$ is then pressed by the action of spring $d'$ against the bevel pinion $e$ of the driving shaft $m$ so that the control shaft $f$ is rotated by the friction wheel $c'$, the driven shaft $n$ being rotated by the worm $q$ and worm wheel $g$. Owing to the resistance of the worm wheel $g$ the thrust of the worm acts in the direction of the arrow $h$ and pulls the control shaft $f$ strongly in the direction $h$, whereby the friction wheel $c'$ is strongly pulled against the bevel pinion $e$ in accordance with the energy taken up by the worm wheel $g$. The nut $i$ travels, owing to the rotation of the spindle $f'$, in the direction $h$ until it strikes against the end wall $k$ of the casing so that it is stopped, the shaft $f$ beginning then to shift in the direction of the arrow $h'$, whereby the friction wheel $c'$ is disengaged from the pinion $e$, the friction wheel $c$ being brought into gear with said pinion $e$. The short idle run in the travelling movement of nut $i$ between this disengaging and re-engaging is overcome by the action of the centrifugal force of the rotating elements of the gear. The spring $d$ prevents jerk-wise stopping of the gear. After the reversing the nut $i$ travels in the direction $h'$ until it strikes against the abutment $k'$ of the casing, so that the reversing takes place again.

For disengaging, the lever $a$ has to be turned. The control mechanism shown in the drawing, according to which at the reversing the disengaging of the one friction wheel is effected or prepared, the engaging of the other friction wheel being however prevented, makes it possible to stop the driven machine accurately at a predetermined moment.

Instead of the friction wheels shown, clutches might be used, and for the worm and worm wheel helical wheels or a screw might be substituted. The reversing gear is adapted to be used also for accelerated backward movement and for adjustable speeds.

I claim:—

1. A reversing gear with automatic reversing, comprising in combination with the driving shaft and the driven shaft, a shiftable control-shaft between said driving shaft and said driven shaft, a bevel pinion on the end of the driving shaft, two bevel friction wheels shiftably keyed on said control shaft, a spring acting on the rear side of each friction wheel, an abutment for each spring on said control shaft, said springs pressing alternately one of said friction wheels against said driving pinion, a worm on said control-shaft, and a worm wheel on said driven shaft meshing with said worm and producing by its working resistance an axial thrust upon said control shaft alternately in the one or other direction so that the spring abutment of the friction wheels acts alternately on the corresponding spring whereby the corresponding friction wheel is brought into engagement with said bevel pinion, and an automatic reversing mechanism for the shiftable control-shaft.

2. A reversing gear with automatic reversing, comprising in combination with the driving shaft and the driven shaft, a shiftable control-shaft between said driving shaft and said driven shaft, a bevel pinion on the end of the driving shaft, two bevel friction wheels keyed on said control shaft, a spring acting on the rear side of each friction wheel, an abutment for each spring on said control shaft, said springs pressing alternately one of said friction wheels against said driving pinion, a worm on said control-shaft, a worm wheel on said driven shaft meshing with said worm and producing by its working resistance an axial thrust upon said control shaft alternately in the one or other direction so that the spring abutment of the friction wheels acts alternately on the corresponding spring whereby the corresponding friction wheel is brought into engagement with said bevel pinion, a spindle on said control shaft, a nut on said spindle, a casing enclosing said spindle and said nut, a braking device for stopping said nut alternatingly at the one or other end of its travel so that said control shaft is shifted and the other friction wheel is brought into gear with said driving gear whereby the direction of rotation of the control shaft is reversed, and a control device for engaging or disengaging said reversing gear.

3. In a reversing gear with automatic reversing as specified in claim 2, in combination with said friction wheels and the spindle portion of said control shaft and nut, a casing in which said nut is located, an abutment at each end of said casing for limiting the travel of said nut to stop the same at the end of each travel for shifting said control shaft and altering the engaging of said friction wheels and the direction of rotation of said control shaft.

4. In a reversing gear with automatic reversing as specified in claim 2, in combination with said driving pinion, control shaft, casing and friction bevel wheels, a hand lever pivotally mounted on said casing, a rod parallel to said control shaft extending from said hand lever to behind one of said friction bevel wheels, and a lever arm at the free end of said rod bent at right angles and having an inclined end face designed to act onto the corresponding friction wheel to prevent the same from coming into gear with the friction pinion.

In testimony whereof I affix my signature.

RUDOLF MEYER.